(12) United States Patent  (10) Patent No.: US 8,026,670 B2
Fryer  (45) Date of Patent: Sep. 27, 2011

(54) ELECTRONIC CIRCUIT FOR DRIVING ELECTROLUMINESCENT DISPLAY

(75) Inventor: Christopher James Newton Fryer, Cottenham (GB)

(73) Assignee: MFlex UK Limited, Cambridge (GB)

( * ) Notice: Subject to any disclaimer, the term of this patent is extended or adjusted under 35 U.S.C. 154(b) by 339 days.

(21) Appl. No.: 12/303,183

(22) PCT Filed: Jun. 1, 2007

(86) PCT No.: PCT/GB2007/002032
§ 371 (c)(1),
(2), (4) Date: Feb. 16, 2009

(87) PCT Pub. No.: WO2007/141494
PCT Pub. Date: Dec. 13, 2007

(65) Prior Publication Data
US 2009/0153064 A1  Jun. 18, 2009

(30) Foreign Application Priority Data
Jun. 3, 2006 (GB) .................................. 0611006.8

(51) Int. Cl.
*G09G 3/10* (2006.01)
(52) U.S. Cl. .................. 315/169.3; 315/200 R; 315/226
(58) Field of Classification Search ............... 315/169.3, 315/200 R, 205, 226, 283, 246, 291
See application file for complete search history.

(56) References Cited

U.S. PATENT DOCUMENTS

| | | | |
|---|---|---|---|
| 6,038,153 A | 3/2000 | Andersson et al. | |
| 6,175,191 B1 | 1/2001 | Yamazaki | |
| 6,462,485 B1 * | 10/2002 | Kimball | 315/169.3 |
| 6,774,576 B2 * | 8/2004 | Schoenbauer et al. | 315/169.3 |
| 7,151,344 B2 * | 12/2006 | Wood | 315/169.3 |
| 2003/0132712 A1 | 7/2003 | Wood | |
| 2004/0160194 A1 | 8/2004 | Wood | |
| 2005/0007027 A1 | 1/2005 | Fryer et al. | |
| 2005/0017650 A1 | 1/2005 | Fryer et al. | |

FOREIGN PATENT DOCUMENTS

| | | |
|---|---|---|
| EP | 0971565 A1 | 1/2000 |
| GB | 2 405 270 A | 2/2005 |
| GB | 2404772 | 2/2005 |
| WO | 98/57524 | 12/1998 |
| WO | 99/55121 | 10/1999 |
| WO | 00/72638 A1 | 11/2000 |
| WO | 2005/006286 | 1/2005 |
| WO | 2005/013248 | 2/2005 |

* cited by examiner

*Primary Examiner* — Don Le

(74) *Attorney, Agent, or Firm* — Keating & Bennett, LLP

(57) ABSTRACT

An electroluminescent circuit for driving an electroluminescent display having a plurality of segment electrodes and a common electrode. The circuit comprises a DC power supply, an output terminal for each of the segments and common electrodes and at least one supply half H-bridge for connecting at least one of each of the segment electrodes and the common electrode selectively to one of the DC supply and a reference voltage. Each supply half H-bridge comprises a top switch and a bottom switch in series having a junction between them. The top switch is connected to the DC supply and the bottom switch is connected to a reference voltage. A discharge circuit is provided for selectively discharging the electroluminescent display, the discharge circuit comprising a discharge half H-bridge in which a top switch is connected to the DC supply and to a discharge path.

34 Claims, 2 Drawing Sheets

ELECTRONIC CIRCUIT FOR DRIVING ELECTROLUMINESCENT DISPLAY

TECHNICAL FIELD

The present invention relates to an electronic circuit for driving an electroluminescent display and to a display in combination with such a circuit.

BACKGROUND OF THE INVENTION

Electroluminescent displays can have selectively illuminable regions for displaying information. Such displays have the advantage over competing technologies that they can be large, flexible and are relatively inexpensive.

Although electroluminescent lamps were known in the 1950s, these had a short lifetime and it was not until the 1980s that a flexible electroluminescent device was developed. However, this was used as an LCD backlight and only recently have practical electroluminescent displays become available.

Electroluminescent displays generally comprise a layer of phosphor material, such as a doped zinc sulphide powder, between two electrodes. It is usual for at least one electrode to be composed of a transparent material, such as indium tin oxide (ITO), provided on a transparent substrate, such as a polyester or polyethylene terephthalate (PET) film. The display may be formed by depositing electrode layers and phosphor layers onto the substrate, for example by screen printing, in which case opaque electrodes may be formed from conductive, for example silver-loaded, inks.

Examples of electroluminescent devices are described in WO 00/72638 and WO 99/55121.

An electroluminescent display of the general type described above is illuminated by applying an alternating voltage of an appropriate frequency between the electrodes of the lamp to excite the phosphor.

Commonly, the phosphors used in electroluminescent displays require a voltage of a few hundred volts.

Typically, such electroluminescent displays may have a capacitance in the range 100 pF to 50 nF.

Since only a small current is required, this comparatively high drive voltage can easily be produced from a low voltage DC supply by a circuit such as the well known "flyback converter". This comprises an inductor and an oscillating switch arranged in series. In parallel with the oscillating switch, a diode and a capacitor are arranged in series. The switch oscillates between an open state and a closed state. In the closed state, a current flows from the DC supply through the inductor and the switch.

When the switch is opened, the current path is interrupted, but the magnetic field associated with the inductor forces the current to keep flowing. The inductor therefore forces the current to flow through the diode to charge the capacitor. The diode prevents the capacitor discharging while the switch is closed.

The capacitor can therefore be charged to a voltage that is higher than the DC supply voltage, and current at this voltage can be drawn from the capacitor.

In order to supply an alternating current to a load from a flyback converter, an H-bridge may be provided in parallel with the capacitor. In general, an H-bridge comprises two parallel limbs, each limb having a first switch in series with a second switch. On each limb between the first and second switches, there is a node, and the load is connected between the respective nodes of the limbs. Current can flow through the load in one direction via the first switch of one limb and the second switch of the other limb and in the other direction via the other two switches. The switches of the H-bridge are operated so that current flows through the load first in one direction and then in the other.

When discharging the capacitive load, it is known to provide a switched discharge path in parallel with the load to ground. This allows the charge stored in the capacitor to be dumped; the discharge path can be activated to provide a conductive path to ground and closed again when it is desired to stop discharging and recharge the load. In an alternative, it is known to discharge the load to form an auxiliary power supply for the switches of the control circuit (that is the H-bridge and the switch of the flyback converter) for the capacitive load; see for example United Kingdom patent application publication number GB2 405 270.

If the display is to be capable of selectively illuminating several different regions or "segments", each segment will be provided with its own segment electrode at the rear of the display. All the segments typically share a common electrode in the transparent ITO electrode at the front of the display. Accordingly, it is known to drive each segment electrode with a "half-H-bridge" comprising a pair of switches in series, the electrode connected between the pair. One end of the pair is connected to the HV power supply, whereas the other end is connected to an appropriate reference voltage (typically ground). By closing one switch and opening the other, the segment electrode can be connected to either the HV power supply or ground.

Conversely, the common electrode is also connected to the power supply and ground by a half-H-bridge in the same manner. However, the half-H-bridge of the common electrode is generally operated in anti-phase with the segment electrodes of the segments that are to be lit, such that when the segments are connected to the power supply, the common electrode is connected to ground and vice versa. Accordingly, a HV AC signal can be generated across the segments of interest, thereby illuminating them.

SUMMARY OF THE INVENTION

According to a first aspect of the invention, there is provided an electronic circuit for driving an electroluminescent display having a plurality of segment electrodes and a common electrode, the circuit comprising a DC supply, an output terminal for each of the segments and common electrode and at least one supply half-H-bridge for connecting at least one of each of the segment electrodes and the common electrode selectively to one of the DC supply and a reference voltage, each supply half-H-bridge comprising a top switch and a bottom switch in series and having a junction between them, the output terminal of the relevant electrode being connected to the junction, the top switch being connected to the DC supply and the bottom switch being connected to the reference voltage, in which a discharge circuit is provided for selectively discharging the EL display, in which the discharge circuit comprises a discharge half-H-bridge, in which the top switch of the discharge half-H-bridge is connected to the DC supply and to a discharge path.

Given that half-H-bridges are likely to be used already in a multiple segment EL display, the use of a well known circuit is advantageous as it provides for reuse of this common element in a new way; the components in the circuit are therefore more homogenous.

The discharge half-H-bridge and at least one of the supply half-H-bridges may be provided on a common integrated circuit (IC). It is well known to provide multiple half-H-bridges on an IC, and by using such an IC the need for a separate discharge switch may be reduced. Indeed, given that the number of half-H-bridges provided on such an IC may be some fixed number such as eight, then (depending on the number of segments in the display) there may be a spare half-H-bridge, which can form the discharge half-H-bridge, thereby using otherwise unutilised circuitry. The IC may be an application specific IC (ASIC).

The discharge path may comprise a connection to the reference voltage. This connection may be direct, or may be via a resistor in the discharge path in order to control the speed of the discharge. Alternatively, the discharge path may comprise an auxiliary power supply that is arranged to, in use, provide the current discharged from the EL display for reuse. Typically, this current will be provided at a lower voltage than the DC supply. The auxiliary power supply may be arranged to supply the discharged current to switching elements of the circuit, to a further display or to any other device that may usefully be powered by the discharged current.

The auxiliary power supply may comprise an auxiliary power supply diode, arranged to prevent current flowing from the auxiliary power back through the discharge half-H-bridge when the bottom switch of the discharge half-H-bridge is closed.

The auxiliary power supply may comprise a capacitor, arranged such that, in use, discharged current from the EL display is stored for reuse. The capacitor may therefore act to smooth the voltage generated by the auxiliary power supply.

The auxiliary power supply may comprise voltage-limiting means for limiting the voltage generated by the auxiliary power supply. This may comprise a zener diode.

The DC supply may comprise a voltage converter, arranged to convert a low voltage input to a high voltage output. The voltage converter may comprise a flyback converter, which itself may comprise an inductive element and a switching element arranged in series. The output switching element may be arranged to switch, in use, between a first state and a second state, whereby in the first state a current path is provided through the inductive element and the output switching element, which current path is interrupted in the second state, such that when the output switching element changes from the first state to the second state, the inductive element generates a voltage at an output of the circuit for charging a capacitive load.

The voltage converter may further comprise an output diode arranged so as to prevent current flowing back into the voltage converter output while the output switching element is in the first state. The output diode may be any suitable device which allows current flow in one direction only. The role of the output diode is to allow a higher voltage than the DC supply voltage to be stored on the capacitive load without current flowing back from the capacitive load towards the inductive element.

The DC supply may further comprise a power supply capacitor, in parallel between the electrodes and the reference voltage. The discharge path may be arranged such that this power supply capacitor discharges when the discharge path is connected to the DC supply. In any case, the discharge path, when connected to the DC supply, will typically cause the EL display to discharge.

The output switching element may be any suitable switching device and, in general, is a transistor. In the preferred arrangement, the switching element is a field effect transistor (FET). In a particularly preferred arrangement, the output switching element is an n-channel FET.

The reference voltage is typically ground. Each of the supply half-H-bridges may be arranged so that only one or other of the top or bottom switches thereof may be closed at any given time; this removes the possibility for unexpectedly short circuiting the DC supply to the reference voltage.

Typically, a plurality, the majority or all of the outputs for the segment and common electrodes will be provided with a supply half-H-bridge.

According to a second aspect of the invention, there is provided a multiple-segment electroluminescent display in combination with an electronic circuit according to the first aspect of the invention.

According to a third aspect of the invention, there is provided, in an electronic circuit for driving an electroluminescent display having a plurality of segment electrodes and a common electrode, the circuit comprising a DC supply, an output terminal for each of the segment and common electrodes and at least one supply half-H-bridge for connecting at least one of each of the segment electrodes and the common electrode selectively to one of the DC supply and a reference voltage, each supply half-H-bridge comprising a top switch and a bottom switch in series and having a junction between them, the output terminal of the relevant electrode being connected to the junction, the top switch being connected to the DC supply and the bottom switch being connected to the reference voltage, use of a further, discharge half-H-bridge in selectively connecting the EL display to a discharge path.

The discharge path may be to the reference voltage or ground, or to an auxiliary power supply to power at least one further element at a lower voltage than the DC supply. These further elements may comprise switching elements of the circuit, or may be a further display, a sounder or anything else that may conveniently be powered by the discharged current from the EL display.

The discharge half-H-bridge may comprise two switches, a top switch and a bottom switch, in series with a junction therebetween, connected such that the top switch is connected to the DC power supply and the junction is connected to the discharge path (or vice versa). The bottom switch is typically connected to the reference voltage.

These and other features of the present application will become apparent to one of ordinary skill in the art upon review of the following detailed description when taken in conjunction with the drawings and the appended claims.

BRIEF DESCRIPTION OF THE DRAWINGS

There now follows by way of example only a detailed description of two embodiments of the present invention with reference to the accompanying drawings in which.

DETAILED DESCRIPTION OF THE INVENTION

Figure 1:
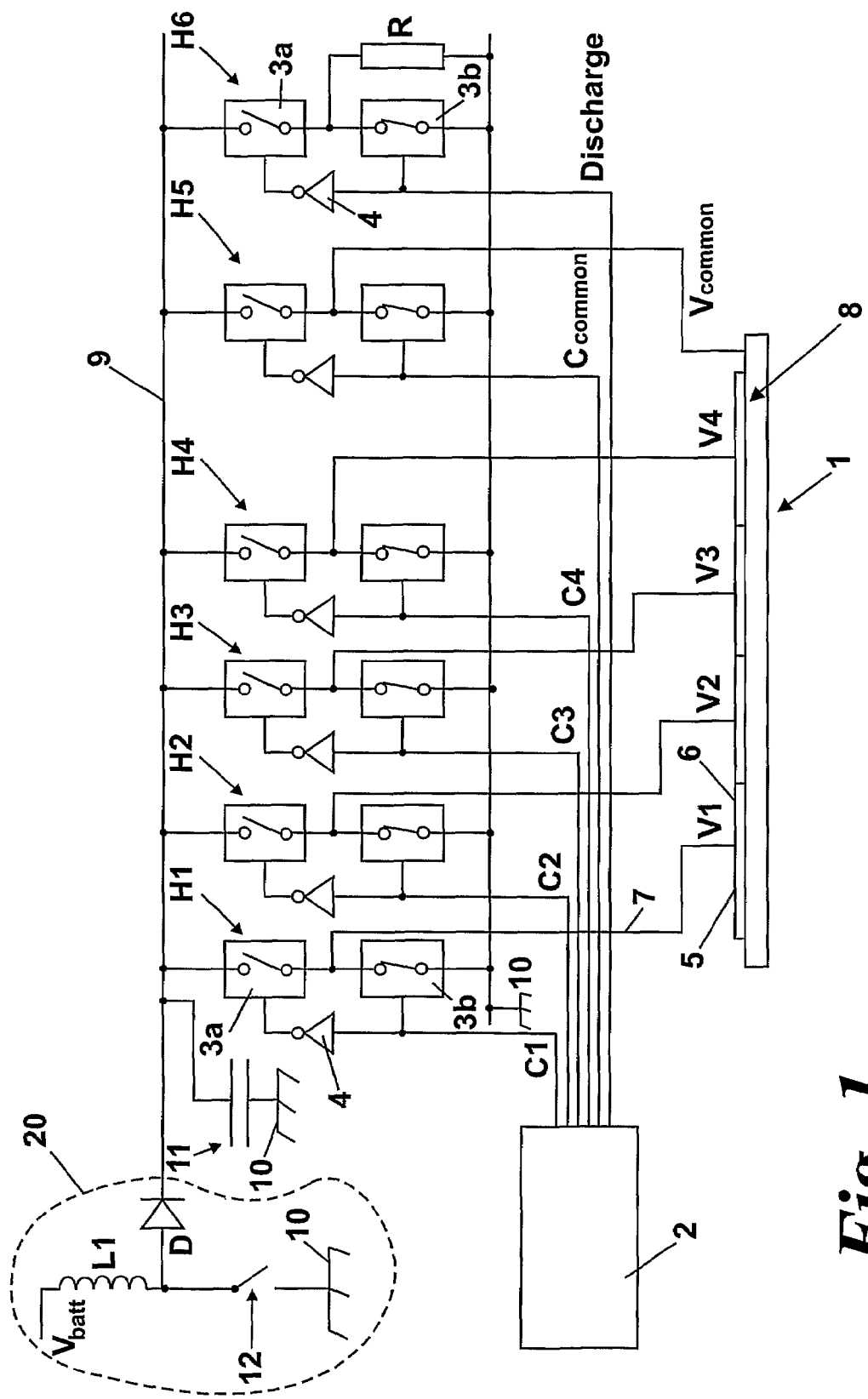
FIG. 1 shows a circuit diagram of an electronic circuit according to a first embodiment of the invention.

FIG. 1 shows an electronic circuit for driving an electroluminescent (EL) display 1, according to a first embodiment of the invention. For simplicity's sake, the circuit is shown as having the combination of outputs required for driving a four-segment display 1 although any number of segments is in principle possible.

The EL display 1 comprises a common electrode 8, formed of an Indium Tin Oxide (ITO) transparent common electrode, and four segment electrodes 5. The segments 6 of the display are defined by the shape of the segment electrodes 5. Application of an alternating voltage across each segment 6 by causing an alternating voltage to be present between a segment electrode and the common electrode causes that segment 6 of the EL display 1—that is the phosphor between the segment electrode 6 and the common electrode 8—to illuminate.

A flyback voltage converter 20 is provided in order to convert the voltage obtained from a battery $V_{batt}$ to a suitable voltage to power the EL display. The flyback converter comprises an inductor L1 and a switch 12. The switch 12 is connected between the inductor and ground 10. In a practical arrangement, the switch 12 is provided by a field effect transistor. However, for the sake of clarity, the switch 12 is shown in the drawings as a simple switch.

A diode D is provided, connected at one end to the junction between the inductor L1 and the switch. The output of the diode forms a high voltage DC supply 9, which is smoothed by a power supply capacitor 11 connected between the diode output and ground 10.

In use, the switch 12 repeatedly switched between open and closed states. When the switch 12 is closed it conducts and provides a path through the inductor L1 to ground. When the switch 12 is open it does not conduct, thereby breaking the path.

When the switch is closed, current flows from the low voltage DC supply—the battery—through the inductor L1 and the closed switch 12 to ground 10. Assuming the voltage on the power supply capacitor 11 is higher than the DC supply voltage, no current flows through the diode D. When the switch is opened, the current path through the inductor L1 and switch 12 is interrupted. However, the energy stored in the magnetic field associated with the inductor L1 forces the current to continue flowing and the inductor L1 generates a sufficiently high voltage that the current flows through the diode D to the HV DC supply 9 and to charge the power supply capacitor 11. In this way, with each switching of the switch 12, the voltage on the capacitive load power supply capacitor 11 and hence the DC power supply 9 is increased. The diode D prevents current flow back from the power supply 9 to ground 10.

A control unit 2 is connected to five supply half-H-bridges H1-H5 by conductors carrying control signals C1-C4 and Ccommon. Each supply half-H-bridge comprises a pair of switches in series being a top switch 3a (connected to the DC power supply 9) and a bottom switch 3b (connected to a ground reference voltage 10), in the form of MOSFET transistors, and an inverter 4. The transistors are controlled by control signals C1-C4, the inverter 6 inverting the sense of the control signal applied to the top switch as opposed to the bottom switch such that when one switch of a pair is open, the other is closed.

The junction between each of the supply half H-bridges H1-H4 is connected to the segment electrode 5 of one segment 6 of the display 1 via a conductor 7. The junction of supply half-H-bridge H5 is connected to common electrode 8. The common electrode is made of a transparent conductive material and is connected to each segment in the known manner.

Thus, control signals C1-C4 and Ccommon control the states of their respective supply half-H-bridges H1-H5 such that each of the segment electrodes 5 and the common electrode 8 can be connected either to the DC supply 9 or ground 10. If an alternating control signal Ccommon is applied to the common electrode supply half-H-bridge H5, then by driving a given segment electrode 5 in the opposite sense to the common electrode 8, an AC voltage will be developed across the relevant segment, which will illuminate. Conversely, by driving a given segment 5 in the same sense as the common electrode, no voltage will be generated across that segment which will not illuminate.

The circuit is also provided with a discharge half-H-bridge H6. As discussed above, this comprises top 3a and bottom 3b switches connected in series. An inverter 4 is again provided such that the switches switch together, but only one is closed at any given time. The top switch 3a is connected to the DC supply 9 as before and the bottom switch is connected to ground. However, the junction between the top 3a and bottom 3b switches is also connected to ground 10 via resistor R—thereby providing a discharge path. This means, that when the control signal "Discharge" is applied to the discharge half-H-bridge, the voltage across the segments 6 of the EL display can pass to ground, as all electrodes will be connected to the same potential—ground 10—either via the respective bottom switch 3b or through the respective top switch 3a and the discharge half-H-bridge H6. The power supply capacitor 11 is also discharged by these means.

All of the half-H-bridges H1-H6 are provided on the same Application Specific Integrated Circuit (ASIC). They are provided with a common DC supply and common ground and so are all substantially identical. This gives the advantage that, as they are all equivalent, the circuit is more homogenous than if a separate switch had been used to connect the discharge path.

Figure 2:
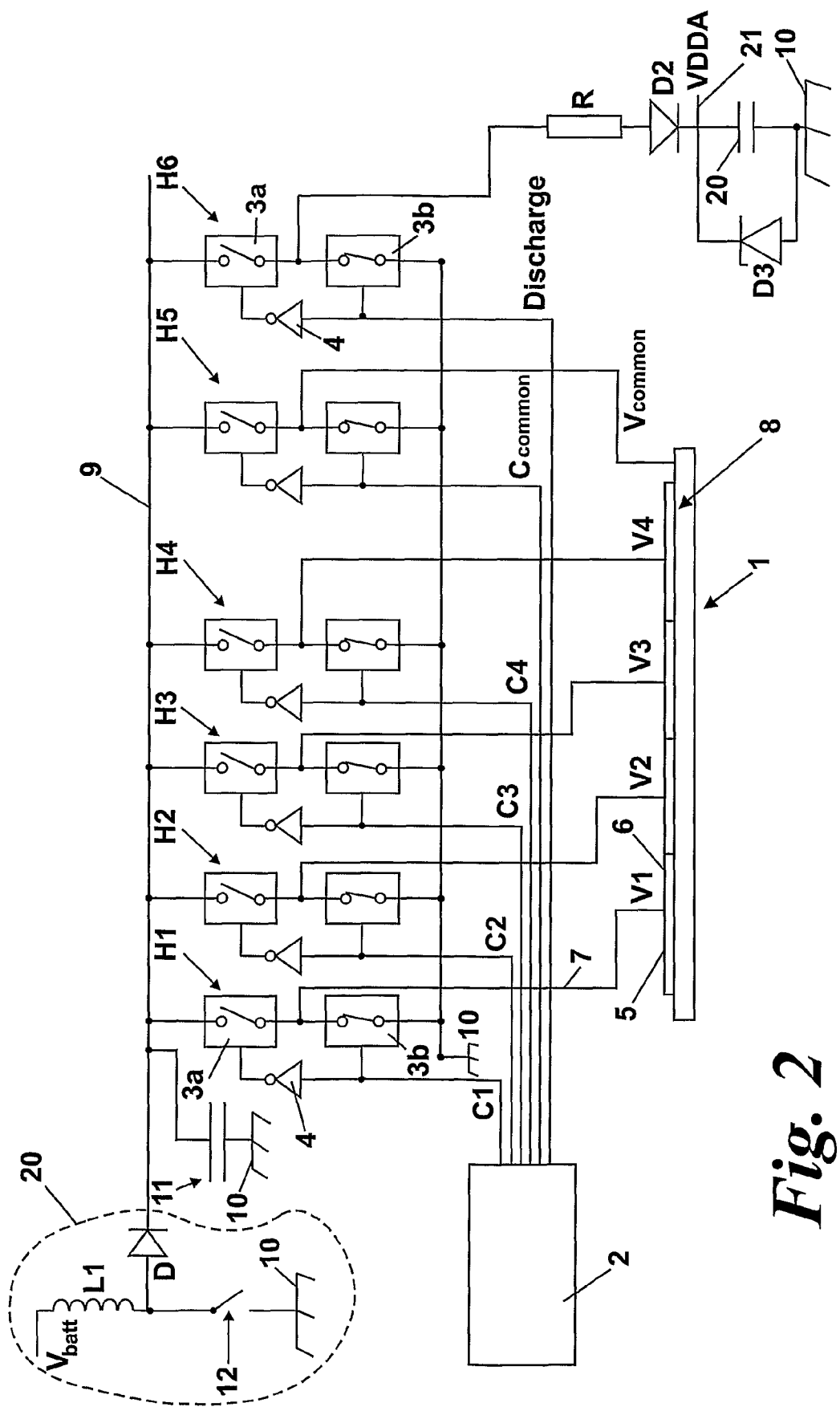
FIG. 2 shows a circuit diagram of an electronic circuit according to a second embodiment of the invention.

An alternative embodiment of the invention is shown in FIG. 2 of the accompanying drawings. This embodiment is similar to that of FIG. 1 of the accompanying drawings and common features have been given common reference numerals.

The functioning of the circuit is largely the same as described above. However, the discharge path from the junction of discharge half-H-bridge H6 is not connected to ground 10. Instead, it is provided to an auxiliary power supply 21. The discharge path is formed of a resistor R and a diode D2 connected in series to the junction so as to throttle current flow and ensure that current can only flow into the auxiliary power supply. The output of the diode D2 forms the auxiliary power supply 21.

Between this output and ground 10 is connected an auxiliary power supply capacitor 20 and a reverse biased zener diode D3. The auxiliary power supply capacitor 20 acts to smooth the current discharged from the EL display whilst the zener diode D3 ensures that the voltage at the auxiliary power supply 20 does not exceed a predetermined limit—for example, 12V. This power supply can be used to power the switches of the electronic circuit herein described, or to power another display, or for any other purpose.

It should be apparent that the foregoing relates only to the preferred embodiments of the present application and that numerous changes and modifications may be made herein without departing from the general spirit and scope of the invention as defined by the following claims and the equivalents thereof.

The invention claimed is:

1. An electronic circuit arranged to drive an electroluminescent display and including a plurality of segment electrodes and a common electrode, the electronic circuit comprising a DC supply, an output terminal for each of the plurality of segment electrodes and the common electrode, and at least one supply half-H-bridge arranged to connect at least one of each of the plurality of segment electrodes and the common electrode selectively to one of the DC supply and a reference voltage, each of the at least one supply half-H-bridge comprising a top switch and a bottom switch connected in series and including a junction between the top switch and the bottom switch of the at least one supply half-H-bridge, the output terminal of the at least one of each of the plurality of segment electrodes and the common electrode being connected to the junction, the top switch of the at least one supply half-H bridge being connected to the DC supply and the bottom switch of the at least one supply half-H bridge being connected to the reference voltage, in which a discharge circuit is provided to selectively discharge the electroluminescent display, in which the discharge circuit comprises a discharge half-H-bridge including a top switch and a bottom switch, in which the top switch of the discharge half-H-bridge is connected to the DC supply and to a discharge path, and in which the top switch and the bottom switch of the discharge half-H-bridge are arranged such that, when the top switch of the discharge half-H-bridge is turned on, the bottom switch of the discharge half-H-bridge is turned off and, when the top switch of the discharge half-H-bridge is turned off, the bottom switch of the discharge half-H-bridge is turned on.

2. An electronic circuit according to claim 1, wherein the discharge half-H-bridge and at least one of the supply half-H-bridge is provided on a common integrated circuit.

3. An electronic circuit according to claim 2, wherein the integrated circuit is an application specific integrated circuit.

4. An electronic circuit according to claim 1, wherein the discharge path comprises a connection to the reference voltage.

5. An electronic circuit according to claim 4, wherein the connection is direct to the reference voltage.

6. An electronic circuit according to claim 4, wherein the connection is via a resistor in the discharge path.

7. An electronic circuit according to claim 1, wherein the discharge path comprises an auxiliary power supply that is arranged to, in use, provide a current discharged from the electroluminescent display for reuse.

8. An electronic circuit according to claim 7 wherein the discharged current is provided at a lower voltage than the DC supply.

9. An electronic circuit according to claim 7, wherein the auxiliary power supply is arranged to supply the discharged current to at least one of switching elements of the circuit and a further display.

10. An electronic circuit according to claim 7, wherein the auxiliary power supply comprises an auxiliary power supply diode, arranged to prevent current flowing from the auxiliary power back through the discharge half-H-bridge when the bottom switch of the discharge half-H-bridge is closed.

11. An electronic circuit according to claim 7, wherein the auxiliary power supply comprises a capacitor, arranged such that, in use, the discharged current from the electroluminescent display is stored for reuse.

12. An electronic circuit according to claim 7, wherein the auxiliary power supply comprises a voltage-limiting element arranged to limit the voltage generated by the auxiliary power supply.

13. An electronic circuit according to claim 12, wherein the voltage-limiting element includes a zener diode.

14. An electronic circuit according to claim 1, wherein the DC supply comprises a voltage converter, arranged to convert a low voltage input to a high voltage output.

15. An electronic circuit according to claim 14, wherein the voltage converter comprises a flyback converter.

16. An electronic circuit according to claim 15, wherein the flyback converter includes an inductive element and a switching element arranged in series.

17. An electronic circuit according to claim 16, wherein the switching element is arranged to switch, in use, between a first state and a second state, whereby in the first state a current path is provided through the inductive element and the switching element, which current path is interrupted in the second state, such that when the switching element changes from the first state to the second state, the inductive element generates a voltage at an output of the circuit for charging a capacitive load.

18. An electronic circuit according to claim 16, wherein the voltage converter comprises an output diode arranged to prevent current flowing back into the voltage converter output while the switching element is in the first state.

19. An electronic circuit according to claim 1, wherein the DC supply comprises a power supply capacitor, in parallel between the plurality of segment electrodes and the common electrode.

20. An electronic circuit according to claim 19, wherein the discharge path is arranged such that the power supply capacitor discharges when the discharge path is connected to the DC supply.

21. An electronic circuit according to claim 20, wherein the discharge path, when connected to the DC supply, causes the electroluminescent display to discharge.

22. An electronic circuit according to claim 16, wherein the switching element is a transistor.

23. An electronic circuit according to claim 22, wherein the switching element is a field effect transistor.

24. An electronic circuit according to claim 22, wherein the switching element is an n-channel field effect transistor.

25. An electronic circuit according to claim 1, wherein the reference voltage is ground.

26. An electronic circuit according to claim 1, wherein each of the at least one supply half-H-bridge is arranged so that only one or another of the top or bottom switches thereof are closed at any given time.

27. An electronic circuit according to claim 1, wherein a plurality, a majority or all of the outputs for the plurality of segment electrodes and the common electrode are provided with a supply half-H-bridge.

28. A multi-segment electroluminescent display in combination with an electronic circuit according to claim 1.

29. An electronic circuit arranged to drive an electroluminescent display and including a plurality of segment electrodes and a common electrode, the electronic circuit comprising a DC supply, an output terminal for each of the plurality of segment electrodes and the common electrode, and at least one supply half-H-bridge arranged to connect at least one of each of the plurality of segment electrodes and the common electrode selectively to one of the DC supply and a reference voltage, each of the at least one supply half-H-bridge comprising a top switch and a bottom switch connected in series and including a junction between the top switch and the bottom switch of the at least one supply half-H-bridge, the output terminal of the at least one of each of the plurality of segment electrodes and the common electrode being connected to the junction, the top switch of the at least one supply half-H-bridge being connected to the DC supply and the bottom switch of the at least one supply half-H-bridge being connected to the reference voltage, a discharge half-H-bridge including a top switch and a bottom switch and being arranged to selectively connect the electroluminescent display to a discharge path, and the top switch and the bottom switch of the discharge half-H-bridge are arranged such that, when the top switch of the discharge half-H-bridge is turned on, the bottom switch of the discharge half-H-bridge is turned off and, when the top switch of the discharge half-H-bridge is turned off, the bottom switch of the discharge half-H-bridge is turned on.

30. An electronic circuit according to claim 29, wherein the discharge path includes a reference voltage or ground.

31. An electronic circuit according to claim 29, wherein the discharge path includes an auxiliary power supply to power at least one further element at a lower voltage than the DC supply.

32. An electronic circuit according to claim 31, wherein the further element comprises at least one of switching elements of the circuit, a further display, and a sounder.

33. An electronic circuit according to claim 29, wherein the top switch and the bottom switch of the discharge half-H-bridge are connected in series with a junction therebetween and arranged such that one of the top switch of the discharge half-H-bridge and the junction is connected to the DC power supply and the other of the top switch of the discharge half-H-bridge and the junction is connected to the discharge path.

34. An electronic circuit according to claim 33, wherein the bottom switch of the discharge half-H-bridge is connected to a reference voltage.

\* \* \* \* \*